April 16, 1940.  A. F. GUYLER ET AL  2,197,043
APPARATUS FOR CUTTING TEXTILE MATERIALS
Filed Nov. 4, 1937  2 Sheets-Sheet 1
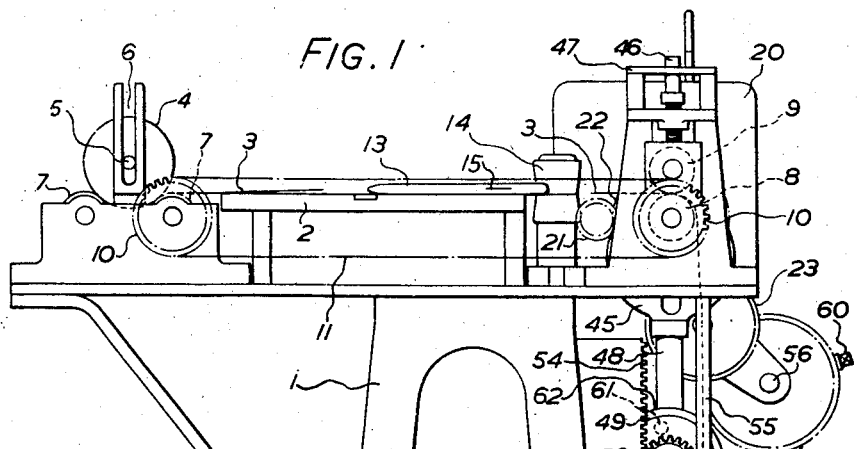
ALBERT F. GUYLER
WILLIAM H. BOALER
INVENTORS
ATTORNEYS April 16, 1940.　　A. F. GUYLER ET AL　　2,197,043
APPARATUS FOR CUTTING TEXTILE MATERIALS
Filed Nov. 4, 1937　　2 Sheets-Sheet 2
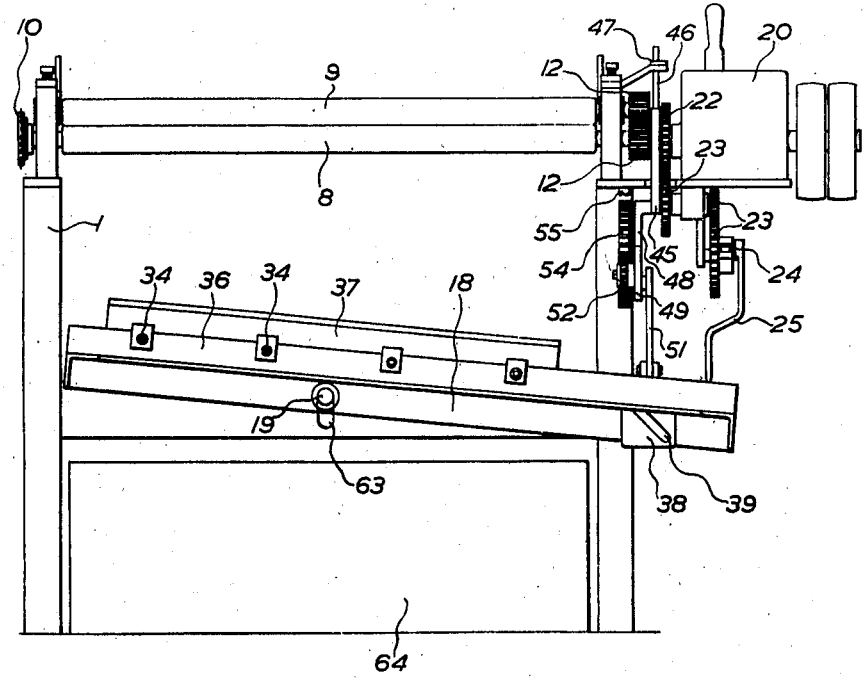
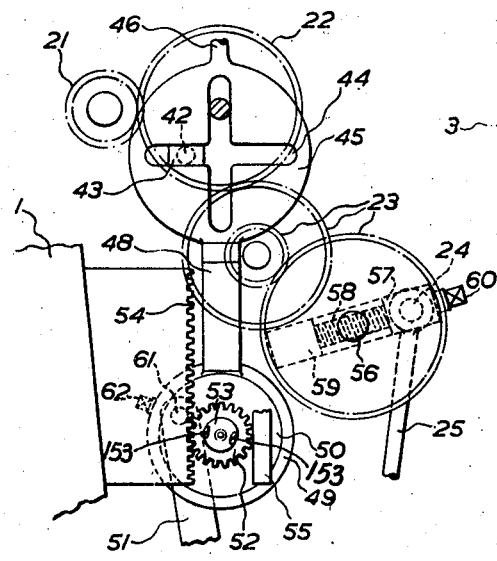
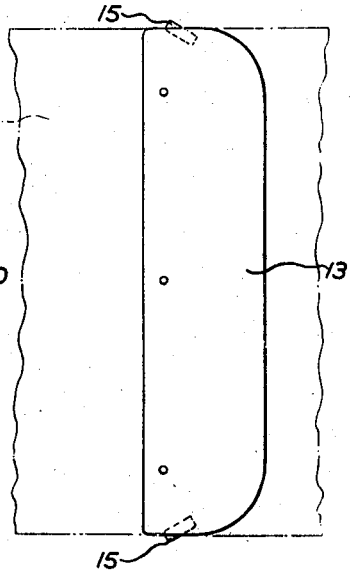
ALBERT F. GUYLER
WILLIAM H. BOALER
INVENTORS
ATTORNEYS Patented Apr. 16, 1940

2,197,043

UNITED STATES PATENT OFFICE 2,197,043

APPARATUS FOR CUTTING TEXTILE MATERIALS

Albert Fairholme Guyler and William Henry Boaler, Spondon, near Derby, England, assignors to Celanese Corporation of America, a corporation of Delaware Application November 4, 1937, Serial No. 172,754
In Great Britain November 25, 1936

11 Claims. (Cl. 164—43)

This invention relates to the treatment of textile materials and is particularly concerned with apparatus for cutting fabric into pieces suitable for the production of garments.

According to the present invention an apparatus for cutting lengths of fabric transversely into pieces having non-parallel edges comprises a pair of blades adapted to co-act, means for causing a length of fabric to pass between said blades, means for positioning said blades alternately in two positions at an angle to each other, and means for actuating said blades to cut fabric passing between them in each of said positions. Conveniently, the blades may be pivoted as a unit about a point midway along their length, and may be swung by suitable means, such as a crank, eccentric or the like, means being provided, acting at one end of the pair of blades and comprising connecting means of variable length, for causing said blades to cut the fabric when they are at or near the ends of their swinging movements. Thus, at the end of one swinging movement the blades may cut across the fabric at right angles to its length and at the end of the reverse movement, at an angle to the first cut.

Any suitable means may be employed for mounting the blades as a unit and for operating the blades. For example, the blades may be mounted in a frame, pivoted to oscillate about an axis at right angles to the length of the blades, and may be operated by a cam adapted to impart a shearing motion to one or both blades and actuated by means of a crank, eccentric or the like acting at twice the frequency of the crank, eccentric or like means employed to oscillate the frame. When, as described above, the blade operating arrangements are disposed at one end of the frame while the frame is pivoted in the middle, means are provided for altering the length of the connecting means between the crank or eccentric and the cam or other blade actuating means, so that cutting may be effected in the two different positions required. For this purpose, a compound connecting means may be employed, including in its length some means for varying the length, e. g. an eccentric, or a toggle mechanism.

In order to ensure certainty of cutting, means may be provided to grip the fabric across its width immediately before cutting takes place. In this way, the fabric is not moving past the blades during the act of cutting, the fabric continuously fed to the gripping means being allowed to accumulate for this short period.

The feed of the fabric to the blades may be effected in any suitable manner. Thus, conveniently, the fabric may be fed to the blades by means of rollers rotating at a constant speed. If desired, two or more layers of fabric may be fed simultaneously. Thus, the fabric fed to the blades may be folded in two, or may be in the form of a tube, suitable means being provided to slit the fabric at the folded edges to form separate layers before the fabric reaches the blades.

By way of example a form of apparatus according to the invention will now be described in greater detail with reference to the accompanying drawings in which Fig. 1 is a side elevation and Fig. 2 is a front elevation of the machine according to the invention;

Figs. 3 and 4 show details of the blades and blade actuating mechanism in the machine shown in Figs. 1 and 2;

Fig. 5 shows details of the connecting link mechanism for actuating the blades;

Fig. 6 shows a fabric spreader for slitting a tube of fabric fed in the machine; and Fig. 7 shows a length of fabric as cut by the machine shown in the preceding figures.

The apparatus comprises a frame 1 carrying at the top a table 2 over which the fabric 3 is drawn. The fabric 3 is provided from a roll 4 mounted behind the table 2 on a spindle 5 whose ends fit in vertical slots 6 so as to allow the roll 4 to fall as the fabric 3 is removed therefrom. The fabric 3 wound upon the roll 4 is in the form of a tube, e. g. a tube of circular knit fabric, or a tube of warp knit fabric as prepared for finishing operations. The roll 4 of fabric rides upon two rollers 7 parallel thereto which are positively driven at the desired fabric speed. In front of the table 2 is a pair of nipping rolls 8, 9 driven at the same speed so as to draw the fabric 3 across the table 2. The drive to the rollers 7 is communicated from the roller 8 by means of sprockets 10 and a chain 11, and gears 12 connect the two rollers 8, 9 together.

As the fabric 3 passes over the table 2 it is drawn round a fabric spreader 13 disposed inside the tube, the spreader, shown in Fig. 6, consisting of a flat piece of wood with smooth edges. In Fig. 1, the fabric is broken away in order to show the spreader 13. The spreader 13 is held in position by means of two vertical rollers 14 disposed outside the fabric tube and just in front of the spreader. At the ends of the fabric spreader 13 and projecting from the edges thereof are two knife edges 15 which, as the fabric 3 is drawn past the spreader 13, slit the fabric at two diametrically opposite points so as to form two sheets of fabric. The two sheets of fabric are drawn through the nipping rolls 8, 9 and fall vertically to the blades 16, 17.

The blades 16, 17 are mounted in a rectangular frame 18, long enough for the fabric 3 to pass through it, which is carried at its mid point by a stub shaft 19 projecting forward from the machine frame 1 and is allowed to pivot about said stub shaft. The nipping rolls 8, 9 are driven from a suitable gear box 20 which also drives, through a suitable chain of gears within the gear box, an external gear 21 engaging with a gear 22. The gear 22 is loose on its shaft and drives through a train of gears 23 a crank-pin 24. The pin 24 is connected to one end of the frame 18 carrying the blades 16, 17 by means of a connecting rod 25. By these means the frame 18 carrying the blades 16, 17 is rocked up and down, the crank-pin 24 and connecting rod 25 being so disposed that in one extreme position the frame 18 carrying the blades is horizontal while in the other it is at an angle to the horizontal.

Of the two blades, 16, 17 one, the blade 16, is mounted firmly on the frame 18 while the other blade, 17, is connected to the said frame by means of a number of short parallel cranks 26 (Figs. 3 and 4) swinging in a horizontal plane and so arranged that as the blade 17 is pulled longitudinally it is compelled by the cranks 26 to swing into cutting engagement with the fixed blade 16. Carried by the moving blade 17 is a gripper 27. The gripper 27 has on its back brackets 28 with slots 29 therein parallel to the length of the gripper, these slots being engaged by the pins 30 by means of which the blade 17 is secured to the short horizontal swinging cranks 26, the pins 30 extending upwardly past the blade 17 and into the slots 29. The gripper 27 is constrained to move in a direction at right angles to the length of the blade 17 by means of two pins 31, one at each end of the gripper 27 and perpendicular thereto, fitting into bearings 32 connected to the stationary blade 16. The gripper 27 is enabled to move at right angles to the length of the blades 16, 17 while the moving blade 17 moves in an arc of a circle by reason of the pin and slot connection 29, 30 between the moving blade 17 and gripper 27. The gripper 27, as it moves, is brought into engagement with a further gripper 33 carried by the stationary blade 16. The gripper 33 is carried on a number of pins 34 passing through a bracket 35 secured to the stationary blade 16, the pins 34 being spring-loaded by springs 36 so that as the gripper 27 on the moving blade 17 engages with the gripper 33 on the stationary blade 16 the gripper 33 on the stationary blade 16 is pressed back against the action of the springs 36. The two grippers 27, 33 engage to grip the fabric immediately before the fabric is cut by the two blades 16, 17. Extended above the grippers 27, 33 and mounted thereon are two obliquely disposed sheets of metal 37 which act as a hopper for the fabric 3, to collect it while it is gripped between the two grippers 27, 33 and to guide it as the grippers separate after cutting, so that the fabric falls between the grippers 27, 33 and between the blades 16, 17.

The longitudinal movement of the moving blade 17, by means of which cutting is effected, is brought about by means shown in detail in Figs. 3 to 5. A plate 38 is provided having a cam slot 39 cut therein, through which slot passes a pin 40 connected by suitable links 41 to the moving blade 17. The cam plate 38 is enabled to move up and down relative to the frame 18 on which the blades 16, 17 are carried, the up and down movement occurring twice for each full oscillation of the frame 18. The cam plate 38 is actuated by connecting means (shown in Fig. 5) driven from the gear box 20 driving the feed rollers 8, 9. For this purpose there is provided a crank in the form of a crank-pin 42 projecting from the gear 22 rotating at twice the speed of the crank-pin 24 driving the frame 18 carrying the blades 16, 17. Upon the crank pin 42 is carried a rectangular block 43 fitting into a horizontal slot 44 in a plate 45 which is guided by means of a rod 46 in a bearing 47 so as to be able to move vertically only. The plate 45 is connected by a vertical member 48 to the sheaf 49 of an eccentric 50. The eccentric 50 is connected by means of a connecting rod 51 to the cam plate 38 actuating the blade 17. The eccentric 50 carries also a sprocket 52, mounted thereon by means of a one way clutch 53, the sprocket 52 engaging with a vertical rack 54 by means of which it is caused to turn through half a revolution each time that the eccentric 50 rises or falls under the influence of the crank-pin 42. A shroud 55 (broken away in Figs. 2 and 5) is provided on the other side of the sprocket 52 to keep the sprocket in engagement with the rack 54. The one way clutch 53 of the sprocket 52, however, is so disposed that the sprocket 52 in its rotation drives the eccentric 50 only when the sprocket 52 is moving downwards over the rack 54. For this purpose the one way clutch 53 comprises a pair of pawls 153 pivotally mounted in recesses in the clutch member 53 and adapted to engage two notches on the internal bearing surface of the sprocket 52. When the sprocket 52 is moving upwards over the rack 54 the eccentric 50 does not move in its sheaf 49. The cam slot 39 of the cam plate 38 is so arranged that cutting takes place when the cam plate 38 is moving upwards, and when the one way clutch 53 is not driving the eccentric 50. In the intermediate strokes, however, the one way clutch 53 drives the eccentric 50 through half a revolution, so that the upper end of the connecting rod 51 occupies alternately a top position and a bottom position. The effect of this mechanism is to vary the length of the connection by means of which the blade-operating cam 38 is driven so as to allow for the different positions of the operating end of the frame 18 carrying the blades 16, 17.

In order that the shape of the pieces of fabric cut by the machine according to the invention may be adjusted, the crank pin 24 is set at an adjustable distance from the shaft 56 on which the last of the gears 23 carrying the crank pin 24 is mounted. For this purpose the pin 24 is carried in a block 57 which may be adjusted along the diameter of the gear 23 by means of a screw 58 carried at one end in a bearing in a block 59 and having a square head 60 at the other end for effecting the adjustment. The pin 61 of the eccentric 50 is similarly adjustable, the square head 62 for this purpose being shown in Fig. 1. By these means the obliquity of the alternate cuts effected by the knives 16 and 17 may be adjusted, the throw of the crank pin 24 being adjustable from zero upwards, and the throw of the pin 61 being similarly adjustable so as to give the desired degree of variation in the action of the cam plate 38. At the same time, the height of the stub axle 19 is adjustable in a vertical slot 63 in the machine frame 1, whereby, for example, the alternate cuts may be maintained horizontal as the maximum obliquity of the frame is altered.

The length of the pieces of fabric cut may be adjusted by means of a suitable range of gears contained in the gear box 20, whereby the speed of the external gear 21 in relation to the speed of the rollers 8, 9 may be adjusted, and so the frequency of the cut effected by the knives 16, 17.

As the machine operates, the fabric 3 is fed at a constant rate and is repeatedly cut by the blades 16, 17, the blades 16, 17 being alternately at right angles to the length of the fabric 3, and oblique. As the pieces of fabric are cut they fall from beneath the blades 16, 17 into a receptacle 64 placed under the blades. Figure 7 shows the manner in which the fabric is cut by the machine. The fabric 65 in this figure is cut across by a succession of cuts 66, 67, of which alternate cuts 66 are at right angles to the length of the fabric 65, and the other cuts 67 are at an angle to the cuts 66.

Having described our invention, what we desire to secure by Letters Patent is:

1. Apparatus for cutting lengths of fabric transversely into pieces having non-parallel edges, said apparatus comprising a pair of blades adapted to co-act and pivoted as a unit about a point midway along their length, means for causing a length of fabric to pass between said blades, means for swinging the blades to and fro as a unit about their pivot point and means for actuating said blades to cut the fabric passing between them when they are at or near the ends of their swinging movements, said actuating means comprising connecting means of variable length adapted to move in a plane parallel to the plane of pivoting of said blades.

2. Apparatus for cutting lengths of fabric transversely into pieces having non-parallel edges, said apparatus comprising a pair of blades adapted to co-act and pivoted as a unit about a point midway along their length, means for causing a length of fabric to pass between said blades, means for swinging the blades to and fro as a unit about their pivot point and means comprising a crank adapted to rotate about a stationary axis, blade actuating means at one end of said pair of blades and connecting means between said crank and said blade actuating means, said connecting means including in its length an eccentric for varying the length of said connecting means and means for rotating said eccentric one half revolution in every alternate stroke of said crank, whereby said blades are caused to cut the fabric passing between them when they are at or near the ends of their swinging movements.

3. Apparatus for cutting lengths of fabric transversely into pieces having non-parallel edges, said apparatus comprising a pair of blades adapted to co-act and pivoted as a unit about a point midway along their length, means for causing a length of fabric to pass between said blades, means for swinging the blades to and fro as a unit about their pivot point and means comprising a crank adapted to rotate about a stationary axis, blade actuating means at one end of said pair of blades and connecting means between said crank and said blade actuating means, said connecting means including in its length an eccentric for varying the length of said connecting means, a sprocket, a one way clutch between said eccentric and said sprocket and a stationary rack engaged by said sprocket and adapted to cause said sprocket to rotate one half revolution in every stroke of said crank whereby said blades are caused to cut the fabric passing between them when they are at or near the ends of their swinging movements.

4. Apparatus for cutting lengths of fabric transversely into pieces having non-parallel edges, said apparatus comprising a pair of blades adapted to co-act, a gripping member in conjunction with each blade, means for causing a length of fabric to pass between said blades and between said gripping members, means for positioning said blades together with said gripping members alternately in two positions at an angle to each other, means for actuating said blades to cut fabric passing between them in each of said positions, means for actuating said gripping members to grip the fabric passing between them before said blades meet to cut the fabric, so as to hold said fabric stationary during cutting, and a sloping plate carried by each gripping member, said plates together constituting a hopper to gather the fabric fed to said blades while the fabric is gripped by said gripping members.

5. Apparatus for cutting lengths of fabric transversely into pieces having non-parallel edges, said apparatus comprising a pair of blades adapted to co-act, a gripping member in conjunction with each blade, means for causing a length of fabric to pass between said blades and between said gripping members, means for positioning said blades together with said gripping members alternately in two positions at an angle to each other, and means for actuating said blades to cut fabric passing between them in each of said positions, said gripping members being so secured to their respective blades as to partake of the cutting movement thereof whereby they are brought together to grip the fabric passing between them before said blades meet to cut the fabric, so as to hold said fabric stationary during cutting, and a sloping plate carried by each gripping member, said plates together constituting a hopper to gather the fabric fed to said blades while the fabric is gripped by said gripping members.

6. Apparatus for cutting lengths of fabric transversely into pieces having non-parallel edges, said apparatus comprising a pair of blades adapted to co-act, a plurality of short equal and parallel links connecting said blades together and adapted to maintain them parallel to each other, a gripping member in conjunction with each blade, means for causing a length of fabric to pass between said blades and between said gripping members, means for positioning said blades together with said gripping members alternately in two positions at an angle to each other, and means for actuating said blades to cut fabric passing between them in each of said positions, one of said gripping members being yieldably mounted relatively to its blade while the other is secured to the other blade by a pin and slot connection and is constrained to move in a direction at right angles to the first gripping member, whereby said members are brought together to grip the fabric passing between them before said blades meet to cut the fabric, so as to hold said fabric stationary during cutting.

7. Apparatus for cutting lengths of fabric transversely into pieces having non-parallel edges, said apparatus comprising a pair of blades adapted to co-act, a plurality of short equal and parallel links connecting said blades together and adapted to maintain them parallel to each other, a gripping member in conjunction with each blade, means for causing a length of farbric to pass between said blades and between said gripping members, means for positioning said blades together with said gripping members alternately in two positions at an angle to each other, a cam plate adapted to move at right angles to the length of said blades, a cam slot in said cam plate, a pin fitting in said slot and actuated thereby, on motion of said plate, in a direction parallel to said blades, a link connection between said pin and one of said blades, means for actuating said cam plate when said blades are in either of said two positions, and means for actuating said gripping members to grip the fabric passing between them before said blades meet to cut the fabric, so as to hold said fabric stationary during cutting.

8. Apparatus for cutting lengths of fabric transversely into pieces having non-parallel edges, said apparatus comprising a pair of blades adapted to pivot as a unit about a point midway along their length and to co-act, a gripping member in conjunction with each blade, means for causing a length of fabric to pass between said blades and between said gripping members, means for swinging said blades together with said gripping members to and fro about their pivot point, means acting at one end of said pair of blades and comprising connecting means of variable length for causing said blades to cut the fabric when they are at or near the ends of their swinging movements, and means for actuating said gripping members to grip the fabric passing between them before said blades meet to cut the fabric, so as to hold said fabric stationary during cutting.

9. Apparatus for cutting lengths of fabric transversely into pieces having non-parallel edges, said apparatus comprising a pair of blades adapted to pivot as a unit about a point midway along their length and to co-act, a gripping member in conjunction with each blade, means for causing a length of fabric to pass between said blades and between said gripping members, means for swinging said blades together with said gripping members to and fro about their pivot point, a crank adapted to rotate about a stationary axis, blade actuating means at one end of said pair of blades, connecting means between said crank and said blade actuating means, said connecting means including in its length an eccentric for varying the length of said connecting means, means for rotating said eccentric one half revolution in every alternate stroke of said crank, and means for actuating said gripping members to grip the fabric passing between them before said blades meet to cut the fabric, so as to hold said fabric stationary during cutting.

10. Apparatus for cutting lengths of fabric transversely into pieces having non-parallel edges, said apparatus comprising a pair of blades adapted to pivot as a unit about a point midway along their length and to co-act, a gripping member in conjunction with each blade, means for causing a length of fabric to pass between said blades and between said gripping members, means for swinging said blades together with said gripping members to and fro about their pivot point, a crank adapted to rotate about a stationary axis, blade actuating means at one end of said pair of blades, connecting means between said crank and said blade actuating means, said connecting means including in its length an eccentric for varying the length of said connecting means, a sprocket, a one way clutch between said eccentric and said sprocket, a stationary rack engaged by said sprocket and adapted to cause said sprocket to rotate one half revolution in every stroke of said crank, and means for actuating said gripping members to grip the fabric passing between them before said blades meet to cut the fabric, so as to hold said fabric stationary during cutting.

11. Apparatus for cutting lengths of fabric transversely into pieces having non-parallel edges, said apparatus comprising a pair of blades adapted to co-act, a gripping member in conjunction with each blade, means for causing a length of fabric to pass between said blades and between said gripping members, means for positioning said blades together with said gripping members alternately in two positions at an angle to each other, means for actuating said blades to cut fabric passing between them in each of said positions, means for actuating said gripping members to grip the fabric passing between them before said blades meet to cut the fabric, so as to hold said fabric stationary during cutting and means for slitting into two sheets a tube of fabric to constitute the length of fabric caused to pass between said blades.

ALBERT FAIRHOLME GUYLER.
WILLIAM HENRY BOALER.